United States Patent

[11] 3,628,751

[72] Inventors Gerhard Brauning
Ruit A. F.;
Wolfgang Ort, Bad Cannstatt, both of Germany
[21] Appl. No. 875,819
[22] Filed Nov. 12, 1969
[45] Patented Dec. 21, 1971
[73] Assignee Eastman Kodak Company
Rochester, N.Y.
[32] Priority Dec. 12, 1968
[33] Germany
[31] P 18 14 221.7

[54] AUTOMATIC FILM-THREADING DEVICE
8 Claims, 4 Drawing Figs.
[52] U.S. Cl.................................................. 242/187,
242/197
[51] Int. Cl...................................................... B65h 59/38,
G03b 1/04, G11b 15/32
[50] Field of Search............................................ 242/192,
186, 210; 226/91, 92; 352/157, 158

[56] References Cited
UNITED STATES PATENTS
| | | | |
|---|---|---|---|
| 3,275,253 | 9/1966 | Cherniavskyj............... | 226/91 X |
| 3,386,675 | 6/1968 | Thomsen...................... | 242/186 |
| 3,429,518 | 2/1969 | McKee......................... | 242/186 |

Primary Examiner—Leonard D. Christian
Attorneys—Robert W. Hampton and G. Herman Childress ABSTRACT: A film-threading device for a cinematographic projector and/or camera comprises a film capturing wheel positionable adjacent a film roll. A pressure arm engages and urges a loose end of the film roll radially toward the axis of the roll while the roll is driven in a takeup direction. The arm and wheel are positioned relative to the roll so that as the loose end of the film slides past the arm it is driven radially outwardly and into engagement with the wheel whereby teeth on the wheel engage the loose end of the film through one of the perforations in the film while the film is still traveling in a takeup direction. The wheel is driven in a direction which causes the loose end of the film to move in an unwinding direction for feeding the film end into self threading portions of a cinematographic motion picture projector, camera or the like.

WOLFGANG ORT
GERHARD BRAUNING
INVENTORS

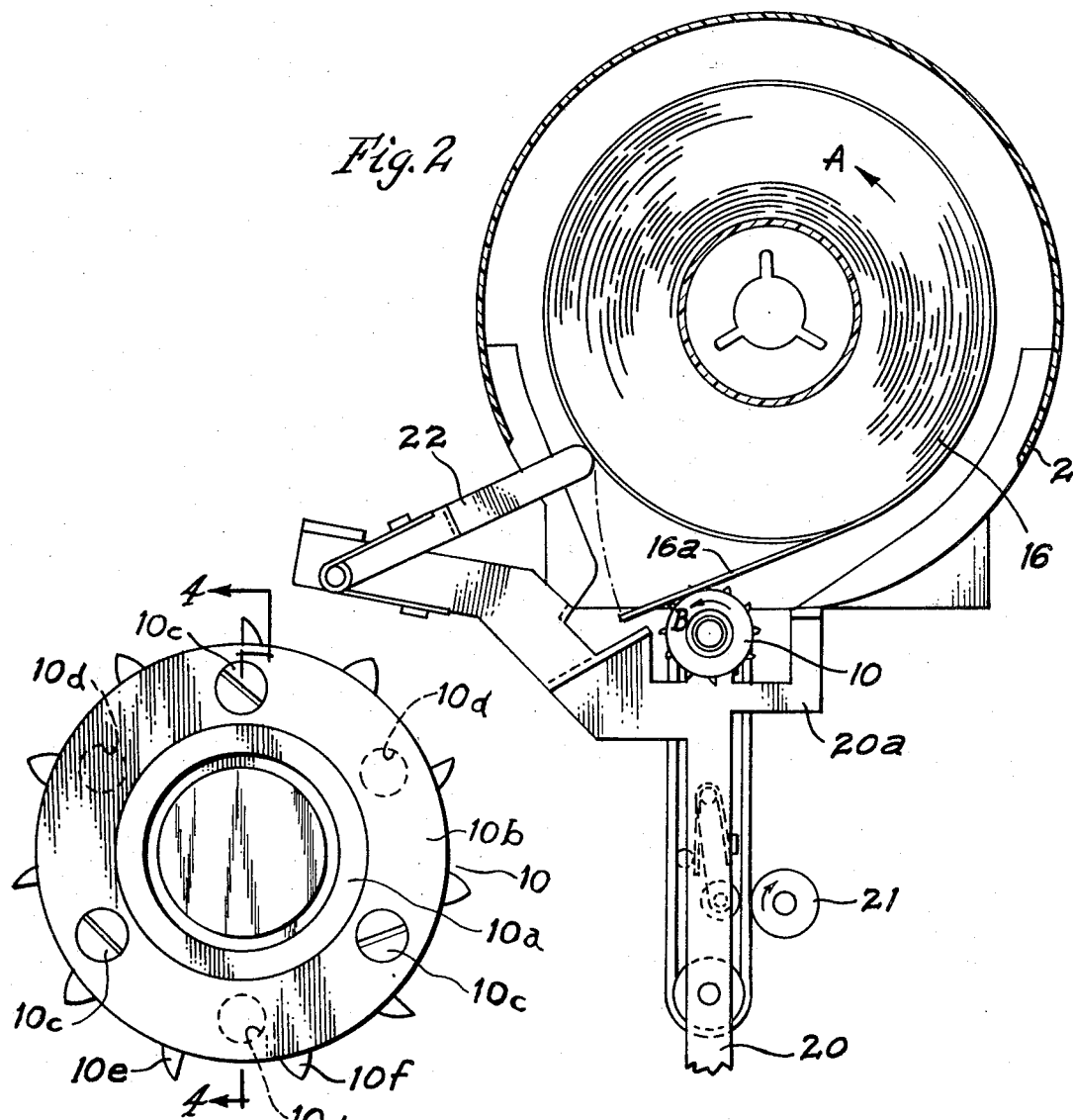
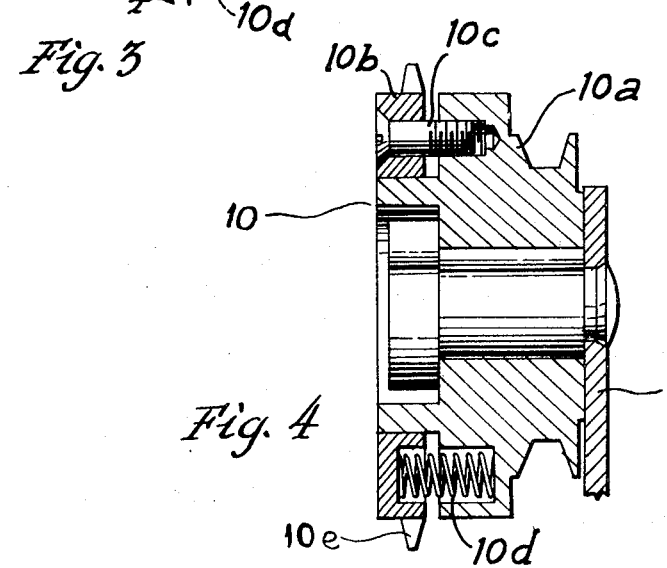

AUTOMATIC FILM-THREADING DEVICE

CROSS-REFERENCE TO RELATED APPLICATION

Reference is made to commonly assigned copending U.S. Pat. application Ser. No. 875,813, entitled AUTOMATIC FILM THREADING DEVICE, filed Nov. 12, 1969 in the names of Wolfgang Ort and Gerhard Brauning (D31,967).

BACKGROUND OF THE INVENTION

1. Field of the Invention

This invention relates to an automatic film feeding or threading device for cinematographic cameras and/or projectors, (and especially such projectors) which are adapted for receiving film cartridges and/or spools, wherein the loose end portion of the film winding is captured or caught and directed to a film-guiding mechanism.

2. Description of the Prior Art

Some prior art movie projectors incorporate film capturing and threading devices, respectively which are alleged to function more or less automatically. Such a projector is disclosed in German Pat. DBGM No. 1,953,886. According to DBGM No. 1,953,886, however, it is necessary to manually insert the free end of the film strip from the applied spool or magazine or cartridge into a film capturing device for further transport to a film guiding mechanism. According to Austrian Pat. No. 252,036, a great deal of effort is required to allow a certain length of the free end of the film strip to project from the cartridge at the end of the rewinding process.

From U.S. Pat. No. 3,429,518, issued Feb. 25, 1969 in the name of E. S. McKee, an automatic threading device is known having a separator or stripping member with a surface for guiding a film strip. The McKee patent also discloses a friction drive member adapted to engage the periphery of a film winding for driving the film in an unwinding direction. The free end of the film strip is fed into a guide formed by the guiding surface of the separator and the friction drive.

SUMMARY OF THE INVENTION

It is an object of the present invention to provide an improved film-feeding mechanism, and particularly such a mechanism that avoids any need for precisely locating the end of a film strip in a cartridge in order to effect automatic removal of film from the cartridge. Another object is to provide a device useful for automatically removing film from spools of film in cartridges and unenclosed spools of film. Furthermore, it is an object of this invention to provide such a threading device which uses means that are quite simple.

In accordance with the present invention suitable means (such as a capture wheel) is provided for engaging the loose end portion of a film through an opening in the film while a roll of the film is driven in a takeup direction and for initiating movement of the loose end portion of the film in an unwinding direction. Other means are provided for positioning said engaging means relative to the film roll so that the engaging means and the loose end portion of the film roll are brought into engagement during rotation of the film roll in the takeup direction. In accordance with a preferred embodiment, the film winding first is rotated slowly in takeup direction and a separator slightly compresses the film winding and separates the free end of the film strip from the winding before the free end reaches the driven capture wheel. The wheel engages with a perforation or opening in the free end portion of the film strip and moves the strip out of a cartridge. An easily responding slip clutch enables the film winding to be rotated in takeoff or unwinding direction by the wheel.

According to one illustrated embodiment of the invention, the separator and the capture wheel are mounted on a pivoted member which is moved against the force of a spring from a disengaged position to an engaged position relative to a cartridge or spool. According to another illustrated embodiment of the invention, the subject device is adapted for use with cartridges and spools having different film capacities by providing a guiding member in lieu of a pivoted member, said guiding member being adapted to be moved in an approximately radial direction with respect to the cartridge or spool axis.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 2 is an elevation which shows another embodiment of a film-threading device of this invention which is for use with cartridges of different sizes;

FIG. 3 is a plan view of a capturing wheel of the invention which alternately has capture and transport teeth; and FIG. 4 is a section taken along line 4—4 of FIG. 3.

DESCRIPTION OF THE PREFERRED EMBODIMENTS

Figure 1:
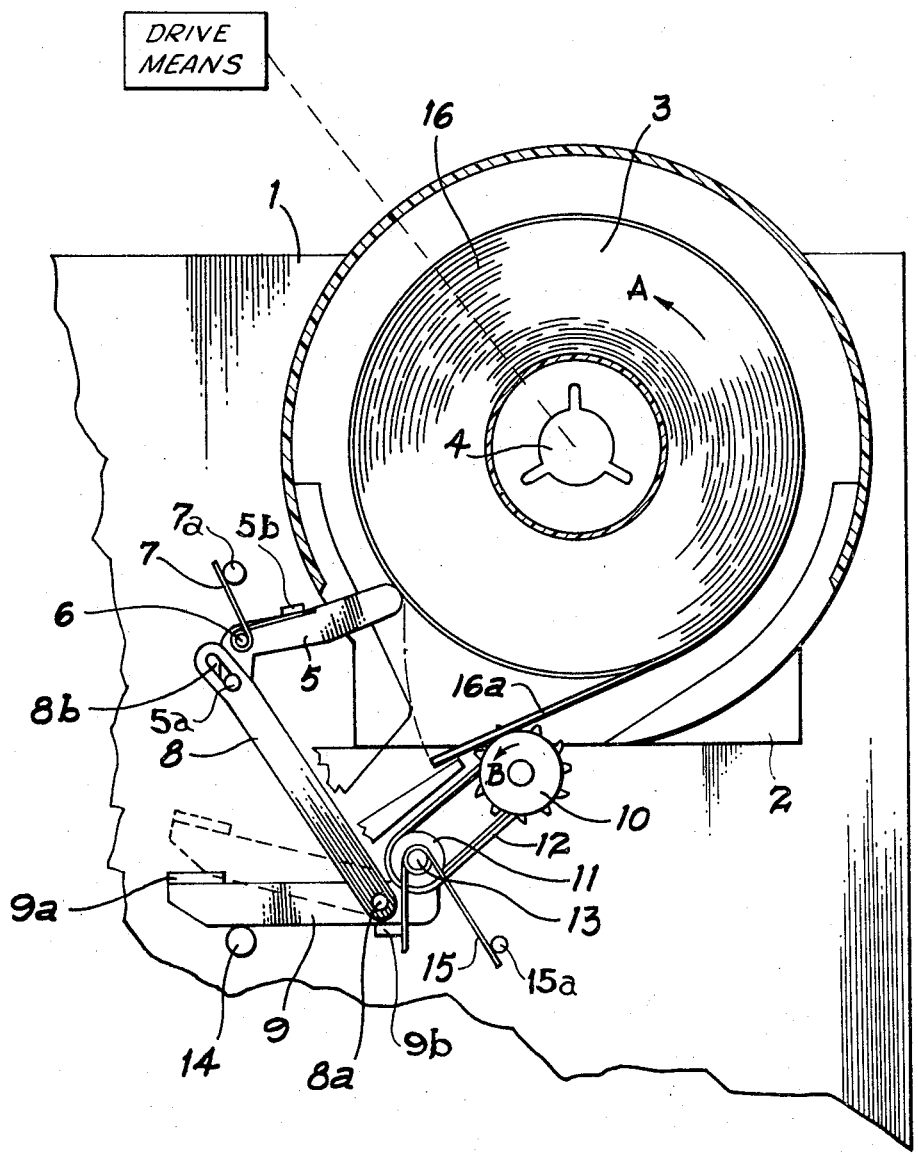
FIG. 1 is an elevation which shows a cartridge with a film-threading device according to one embodiment of this invention in its engaged or operative position.

Because photographic apparatus is well known, the present description will be directed in particular to elements forming part of, or cooperating more directly with, the present invention, apparatus elements not specifically shown or described herein being understood to be selectable from those known in the art.

Referring to FIG. 1, a mechanism plate 1 may be provided with suitable recesses or orienting structure for receiving a cartridge or magazine 2, the cartridge being held in place by latching means (not shown). A film roll or spool 3 within the cartridge, or separate from the cartridge, is driven by means of a spool shaft 4. A film pressure arm 5 pivoted near one end to plate 1 by means of a rivet 6 is urged toward the film winding of spool 3 by the force of a spring 7. Spring 7 has legs bearing against a pin 7a on plate 1 and a flange 5b on arm 5. A lever 8 is pivoted to a control or swing arm 9 at point 8a. Lever 8 acts on arm 5 via a pin and slot connection comprising a pin 5a on arm 5 and a slot 8b in lever 8.

A film capturing wheel 10 is carried by the swing arm 9. As can be seen in detail from FIGS. 3 and 4, wheel 10 comprises a pulley 10a and a tooth ring 10b secured to said pulley. Against the force of three spiral springs 10d, the tooth ring 10b is coupled to the pulley 10a by means of three adjusting screws 10c. By unequal adjustment of screws 10c, ring 10b of wheel 10 can effect a tumbling rotary movement of the teeth when the wheel is driven. This extends the effective capturing range of the wheel in an axial direction. The tooth ring 10b comprises a plurality of capturing teeth 10e and a plurality of transport teeth 10f. Teeth 10b and 10e are alternately arranged as shown in FIG. 3. The capturing wheel 10 is driven in direction B by a pulley 11 via a belt 12 which is trained around pulley 11 and pulley 10a. The pulley 11 is firmly connected to a drive shaft 13.

The swing arm 9 and wheel 10 pivot about the axis of the shaft 13 which, in turn, is pivoted on plate 1. In its operative or engaged position (shown in solid lines in FIG. 1), the swing arm 9 contacts a stop 14. A spring 15 has legs bearing against a pin 15a on plate 1 and a flange 9b on arm 9. Thus, as soon as the pressure on key 9a is released, spring 15 moves the swing arm 9 back to its inoperative or disengaged position shown in dashed lines in FIG. 1. The film winding 16 has the usual film perforations, and its loose end is designated 16a. There is an opening in the bottom of the cartridge through which arm 5 and wheel 10 enter and leave the cartridge and through which film leaves the cartridge and may be returned to the cartridge.

In operation, the swing arm 9 in an inoperative position of the arm is in the dotted line position and keeps the capturing wheel 10 and, via the connecting lever 8, the pressure arm 5 outside the cartridge 2. As a result, the cartridge 2 can be easily exchanged.

A cartridge 2 or unenclosed reel is put into the plate 1 with the film spool 3 being secured to the spool shaft 4, and the cartridge is secured against movement in an axial direction by means not shown in the drawing. Then the swing arm 9 is moved to its operative (solid line) position by means of appropriate transmission elements (not shown) acting on the key 9a. In the course of the swinging movement of arm 9 to its stop 14, the capturing wheel 10 is moved into the film cartridge 2. Upon actuating a switch and motor (not shown), the spool carrying the film winding 16 is rotated in direction A by spool shaft 4 and the capturing wheel 10 is rotated in direction B.

First, in response to movement of arm 9 the film pressure arm 5 is brought into contact with the film winding 16 by operation of the connecting lever 8. Arm 5 slightly compresses the winding and causes the free end 16a of the film strip to separate from the winding and to be engaged by the capturing wheel 10 so that a perforation of the free end 16a is gripped by the teeth 10e and 10f of tooth ring 10b. Since the capturing wheel 10 rotates in the direction B, it moves the free end 16a of the film winding 16 to the guiding device of the projector or camera whereby a clutch (not shown), and preferably a slip clutch which also acts as a brake, becomes effective between spool shaft 4 and its drive motor.

As soon as the free end 16 a of the film winding is engaged by the film guiding device, the task of the film-threading device is fulfilled and the key 9a may be released. The force of spring 15 then returns the swing arm 9 to its inoperative or disengaged position. This causes the capturing wheel 10 as well as the film pressure arm 5 to be withdrawn from the cartridge 2 through the opening in the bottom thereof.

According to the embodiment shown in FIG. 2, the film capture wheel 10 and the film pressure arm 22 are constructed and mounted so that cartridges or spools having widely different film capacities are readily accommodated. In this case, a guide member 20 moves in an axial direction relative to the film roll until a stop 20a contacts the bottom of cartridge 2. The drive is effected by friction wheel 21 in the manner disclosed more fully in the copending patent application entitled "Film Threading Device" filed on Nov. 12, 1969 in the name of Wolfgang Ort and Gerhard Brauning (D31,967). A film pressure arm 22 is supported by the guide member 20 and is disengaged from the film winding together with wheel 10 when the member 20 is moved to the inoperative position (not shown). As for the remaining functions, the mode of operation of the FIG. 2 embodiment corresponds to the embodiment explained hereinbefore with reference to FIG. 1.

It will be understood that it is within the spirit and scope of the invention to form the film pressure arm 22 as a resilient, telescopic part. This enables the use of any size of film winding, e.g., half empty spools, and nevertheless the free end of the film strip can easily be captured and threaded.

The invention has been described in detail with particular reference to preferred embodiments thereof, but it will be understood that variations and modifications can be effected within the spirit and scope of the invention.

We claim:

1. In cinematographic apparatus having means for supporting a roll of film and for driving said film roll in a takeup direction, the film roll having a loose end and having a plurality of spaced perforations, whereby said loose end tends to separate from the roll during rotation of the roll in a takeup direction, the improvement comprising:
    means for engaging the loose end of the film through one of the perforations in the film while the film roll is driven in a takeup direction and for initiating movement of the loose end of the film in an unwinding direction; and
    means for positioning said engaging means relative to the film roll so that the engaging means and the loose end of the film roll are brought into engagement during rotation of the film roll in the takeup direction.

2. Apparatus as set forth in claim 1 wherein said means for engaging the loose end of the film and for initiating movement of the loose end of the film in an unwinding direction comprises a wheel having a plurality of teeth positionable in the perforations in the film, and means coupled to said wheel for rotating said wheel in a direction for feeding film in an unwinding direction.

3. Apparatus as set forth in claim 2 wherein said wheel comprises a ring which carries said teeth and a pulley for rotating the ring, the ring being connected to said pulley so that rotation of the ring from the pulley effects a tumbling rotary movement of the teeth, thereby extending the effective range of said wheel in an axial direction.

4. Apparatus as set forth in claim 1 further comprising a pressure arm selectively engageable with the roll of film to compress the film winding and cause the loose end of the film to separate from the winding, and means linking said pressure arm to said positioning means so that the pressure arm is in engagement with the film roll when the engaging means is positioned relative to the film roll so that the engaging means and the loose end of the film roll are brought into engagement during rotation of the film roll in the takeup direction.

5. Apparatus as set forth in claim 4 wherein said positioning means comprises a member supporting said pressure arm and said means for engaging the loose end of the film, said member being movable in a substantially radial direction relative to the film spool roll whereby said arm and said engaging means may be simultaneously moved into their respective positions relative to film rolls of various diameters.

6. Apparatus as set forth in claim 4 wherein said arm comprises a plurality of elements telescopically adjustable with respect to each other whereby film rolls of various diameters can be engaged by extension or retraction of the elements relative to each other.

7. In cinematographic apparatus having (1) means for supporting a roll of film, the film roll having a loose end portion and having at least one opening in such end portion, and (2) means for driving said film roll in a takeup direction, whereby said loose end portion tends to separate from the roll during rotation of the roll in a takeup direction, the improvement comprising:
    means for engaging the loose end portion of the film through the opening in the film while the film roll is driven in a takeup direction;
    means responsive to engagement of the loose end portion for initiating movement of the loose end portion of the film in an unwinding direction; and
    means for positioning said engaging means relative to the film roll so that the engaging means and the loose end portion of the film roll are brought into engagement during rotation of the film roll in the takeup direction.

8. In cinematographic apparatus having (1) means for supporting a roll of film, the film roll having a loose end portion and having at least one opening in such end portion, (2) means for driving said film roll in a takeup direction, whereby said loose end portion tends to separate from the roll during rotation of the roll in a takeup direction, and (3) means for effecting a threading cycle to feed the loose end portion of the film through the apparatus, the improvement comprising:
    means for engaging the loose end portion of the film through the opening in the film while the film roll is driven in a takeup direction and for initiating movement of the loose end portion of the film in an unwinding direction; and
    means for positioning said engaging means relative to the film roll at the beginning of the threading cycle so that the engaging means and the loose end portion of the film roll are brought into engagement during rotation of the film roll in the takeup direction.

* * * * *